United States Patent
Driever et al.

(10) Patent No.: US 7,039,693 B2
(45) Date of Patent: May 2, 2006

(54) TECHNIQUE FOR VALIDATING A RE-INITIALIZED CHANNEL-TO-CHANNEL CONNECTION

(75) Inventors: Patricia G. Driever, Poughkeepsie, NY (US); John R. Flanagan, Poughkeepsie, NY (US); Kenneth M. Trowell, Terrey Hills (AU); Harry M. Yudenfriend, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 764 days.

(21) Appl. No.: 10/244,285

(22) Filed: Sep. 16, 2002

(65) Prior Publication Data

US 2004/0054785 A1 Mar. 18, 2004

(51) Int. Cl.
*G06F 15/177* (2006.01)

(52) U.S. Cl. .................. 709/221; 709/222; 709/228; 709/249; 370/431; 370/464

(58) Field of Classification Search ........ 709/220–222, 709/227–228, 249, 250; 370/357–359, 419, 370/431, 464; 710/1, 5, 15, 18, 19, 31, 33, 710/36
See application file for complete search history.

(56) References Cited

U.S. PATENT DOCUMENTS

| | | | |
|---|---|---|---|
| 5,197,069 A | | 3/1993 | Cook et al. ................. 371/1 |
| 5,301,323 A | * | 4/1994 | Maeurer et al. ............ 718/105 |
| 5,465,355 A | | 11/1995 | Cook et al. ............ 395/200.15 |
| 5,559,726 A | * | 9/1996 | Berry ........................ 702/181 |
| 5,867,648 A | | 2/1999 | Foth et al. ............... 395/200.6 |
| 6,240,446 B1 | | 5/2001 | Casper et al. ............... 709/213 |
| 6,336,193 B1 | | 1/2002 | Yudenfriend et al. ......... 714/15 |
| 6,338,083 B1 | | 1/2002 | Casper et al. ............... 709/213 |
| 6,728,772 B1 | * | 4/2004 | Driever et al. .............. 709/228 |
| 6,829,659 B1 | * | 12/2004 | Beardsley et al. ............ 710/19 |

OTHER PUBLICATIONS

"Integration of Channel-To-Channel Communication Capability Into A Communication Channel Of A Computing Environment", Driever et al., U.S. Appl. No. 09/570,290, filed May 12, 2000.

"Partition-To-Partition Communication Employing A Single Channel Path With Integrated Channel-To-Channel Function", Driever et al., U.S. Appl. No. 09/569,567, filed May 12, 2000.

(Continued)

*Primary Examiner*—Zarni Maung
*Assistant Examiner*—Van Nguyen
(74) *Attorney, Agent, or Firm*—Floyd A. Gonzalez, Esq.; Kevin P. Radigan, Esq.; Heslin Rothenberg Farley & Mesiti, P.C.

(57) ABSTRACT

Validation of a re-initialized CTC connection between a first channel and a second channel is provided in a computing environment in which a CTC CU function can be provided in either channel after initialization of the CTC connection and can move from one channel to the other after re-initialization of the connection. After initialization, a newly formatted CDR having a device NED and a specific NEQ is stored. After re-initialization, a current CDR with the same format is obtained. The re-initialized CTC connection is validated if the stored set of NED and NEQ values match the current values, in any order.

33 Claims, 9 Drawing Sheets

OTHER PUBLICATIONS

"Automatic Configuration Of A Channel-To-Channel Connection Employing Channel-To-Channel Functioning Integrated Within One Or More Channels Of A Computing Environment", Driever et al., U.S. Appl. No. 09/569,755, filed May 12, 2000.

"Enterprise Systems Architecture/390, Common I/O Device Commands and Self Description", IBM Manual SA22-7204-01 Apr. 1992, Preface pp. 1-3; Chapter 2, Section 3, pp. 1-3; Chapter 3, Section 0, p. 1 through Section 5, p. 2.

"Enterprise Systems Architecture/390, Principles of Operation", IBM Manual SA22-7201-04, Jun. 1997, Chapter 13; Chapter 14; Chapter 15; Chapter 16; Chapter 17, Section 2, p. 1—Section 4, p. 1; chapter 17, Section 9, pp. 1-4.

"Escon & Ficon CTC Reference Document", SB10-7034-01, International Business Machines Corporation, Oct. 2001, Chapter 1, pp. 1-9; Chapter 6, pages 1-10; Chapter 7, pp. 1-6, Chapter 8, pp. 1-8; Chapter B, 1-3.

FICON Architecture—NCITS FC-SB-2 (FICON), Dec. 2000.

* cited by examiner fig. 1 fig. 2A fig. 2B fig. 3 fig. 4 fig. 5A fig. 5B fig. 6A fig. 6B fig. 7A fig. 7B

TECHNIQUE FOR VALIDATING A RE-INITIALIZED CHANNEL-TO-CHANNEL CONNECTION

TECHNICAL FIELD

This invention relates in general to channel subsystems, and more particularly to the validation of a re-initialized channel-to-channel connection that employs CTC control unit functioning at either channel of the CTC connection.

BACKGROUND OF THE INVENTION

Channel-to-channel (CTC) adapters have been used for many years as a general purpose communication mechanism between computer systems. For example, CTC adapters have been the principle mechanism for connecting multiple S/390 system and zSeries (offered by International Business Machines Corporation of Armonk, N.Y.) hosts together in homogeneous environments. S/390 and zSeries hosts can also be connected to other heterogenous environments, such as IBM's RS/6000 and/or AS/400 systems. The CTC adapter is independent of the end users protocol, and has wide application in areas such as coupling of multiprocessor systems as well as in traditional communications protocol stacks (e.g., TCP/IP, SNA).

The CTC adapter provides a CTC control unit (CU) function within a channel residing in a channel subsystem. The CTC CU function provides control of CTC I/O devices. I/O device types include such components as peripheral cache memories, data storage units such as direct access storage devices (DASD), printers, tape recorders, and the like. From a programming viewpoint, control of a CTC I/O device is accomplished through a logical device (simply "device" hereinafter), each residing in a channel subsystem and associated with a CTC CU function.

When an I/O device is controlled through commands passing from a channel in one channel subsystem to a channel in another channel subsystem via a CTC CU function, the link between the channels is a CTC connection (or channel path) comprising one or more logical paths. When a system first becomes operational, typically at least one logical path is established and one or more CTC connections are initialized, thus allowing I/O commands to control devices. Logical paths and their associated CTC connection may be disrupted after a link failure, which may occur, for example, when a processor is powered off due to its failure or for scheduled maintenance.

After a link failure, a device formerly controlled through the broken CTC connection is non-operational. During this non-operational period, I/O commands to that device are queued, awaiting re-establishment of the formerly established logical path(s). When the error condition is repaired or when maintenance is complete, the affected logical path(s) need to be re-established, thus re-initializing the broken CTC connection.

Because a logical path may be re-established to a channel subsystem that is different from the one it was linked to before the link failure, the integrity and security of data processed by the queued I/O commands need to be assured. Data integrity and security is confirmed through validation of the re-initialized CTC connection. This validation procedure comprises comparing self description data of the device which is to receive the queued I/O commands. The self description data stored before the link failure and is compared to the self description data retrieved after the CTC connection is re-initialized.

Self description data describes a device, and may be constructed from, for instance, identification and configuration data retrieved from a channel. Conventionally, self description data is stored in a configuration data record (CDR). One field of a CDR is a token node element descriptor (TNED). The TNED describing a device identifies the channel subsystem with which the device is associated. If the TNED of a CDR stored before a link failure does not match the TNED of a CDR retrieved after re-initialization of a CTC connection, the CTC connection is considered invalid. With such a finding of invalidity, the re-established logical path for the device is assumed to be connected to a different channel subsystem and thus, to protect data integrity, the device is "boxed" so that any I/O commands destined for the device are rejected.

In the art of CTC connections, further enhancements are needed to minimize the unavailability of devices after link failures.

SUMMARY OF THE INVENTION

Pending U.S. patent application Ser. No. 09/569,755 entitled "Automatic Configuration of a Channel-to-Channel Connection Employing Channel-to-Channel Functioning Integrated Within One or More Channels of a Computing Environment," filed May 12, 2000, which is hereby incorporated herein by reference in its entirety, describes a load balancing algorithm that may cause the CTC CU function to migrate from a channel on one end of the CTC connection to a channel on the other end following a re-initialization of the connection. When such a migration occurs, the device is associated with a different channel subsystem (the subsystem on the other end of the original CTC connection). Because of this change in the associated subsystem, the TNEDs in the conventional CDRs describing the device do not match, causing the typical validation procedure to falsely determine an invalid CTC connection, resulting in boxing of the device. This determination is false because the subsystem endpoints of the CTC connection after re-initialization are identical to those existing before the link failure. Because the endpoints remain the same, processing the queued I/O commands does not pose a risk to data integrity or security.

The shortcomings of the prior art are overcome and additional advantages are provided through the provision in one aspect of a method of validating a CTC connection between a first and second channel in a computing environment, wherein a CTC CU function is provided within either channel and can switch between those channels with re-initialization of the CTC connection. The method includes, for instance, obtaining a first node element descriptor (NED) of one of the two channels and a first node element qualifier (NEQ) of the other channel after initialization of the CTC connection between the channels; obtaining, subsequent to re-initialization of the CTC connection, a second NED of one of the two channels and a second NEQ of the other channel; and validating the re-initialized CTC connection if the first NED matches the second NED and the first NEQ matches the second NEQ, or if the first NED matches the second NEQ and the first NEQ matches the second NED.

In one enhanced aspect of the present invention, the method of validating the CTC connection further includes obtaining, for the first NED, identification data from the channel that provides the CTC CU function of the CTC connection, and obtaining, for the first NEQ, identification data from the other channel. In another enhanced aspect of the present invention, the method of validating further includes obtaining, for the second NED, identification data from the channel that provides the CTC CU function upon re-initialization of the CTC connection, and obtaining, for the second NEQ, identification data from the other channel.

Systems, computer program products and data structures corresponding to the above summarized methods are also described and claimed herein.

Aspects of the present invention advantageously enable newly formatted CDRs to be used in validating a CTC connection. In the new format, a specific NEQ field is added to identify, for example, the channel on the end of the CTC connection opposite the end where the CTC CU function resides. By working with the new NEQ field, the device NED field in a CDR has an expanded use. The device NED (or simply, "NED") describes the device associated with the CTC CU function by using identification data from, for example, the channel providing the CTC CU function. By using the NED and NEQ as an unordered pair in the comparison described above, the enhanced validation technique of the present invention avoids the false detection of an invalid CTC connection when the CTC CU function switches from end to end. By appropriately and automatically validating the CTC connection under these circumstances, the present invention decreases the unwarranted unavailability of devices without requiring operator intervention.

Additional features and advantages are realized through the techniques of the present invention. Other embodiments and aspects of the invention are described in detail herein and are considered a part of the claimed invention.

BRIEF DESCRIPTION OF THE DRAWINGS

The above-described objects, advantages and features of the present invention, as well as others, will be more readily understood from the following detailed description of certain preferred embodiments of the invention, when considered in conjunction with the accompanying drawings in which.

BEST MODE FOR CARRYING OUT THE INVENTION

As briefly noted above, this invention relates generally to validating a channel-to-channel (CTC) connection between two channels within a computing environment, where either channel may provide a CTC control unit (CU) function. The validation technique disclosed herein avoids a false indication of a configuration error when the CTC control unit (CU) function switches from one end of the CTC connection to the other after re-initialization of the CTC connection.

The validation technique may be employed in a computing environment based on, for example, one or more zSeries 900 computers offered by International Business Machines Corporation, Armonk, N.Y. CTC connections in a zSeries 900 environment are described in an IBM publication entitled "ESCON and FICON Channel-to-Channel Reference," IBM Publication No. SB10-7034-01, Second Edition, October 2001, which is hereby incorporated herein by reference in its entirety. Further, the computing environment may include, for instance, at least one processor or central electronic complex (CEC) having one or more logical partitions and one or more channels.

Figure 1:
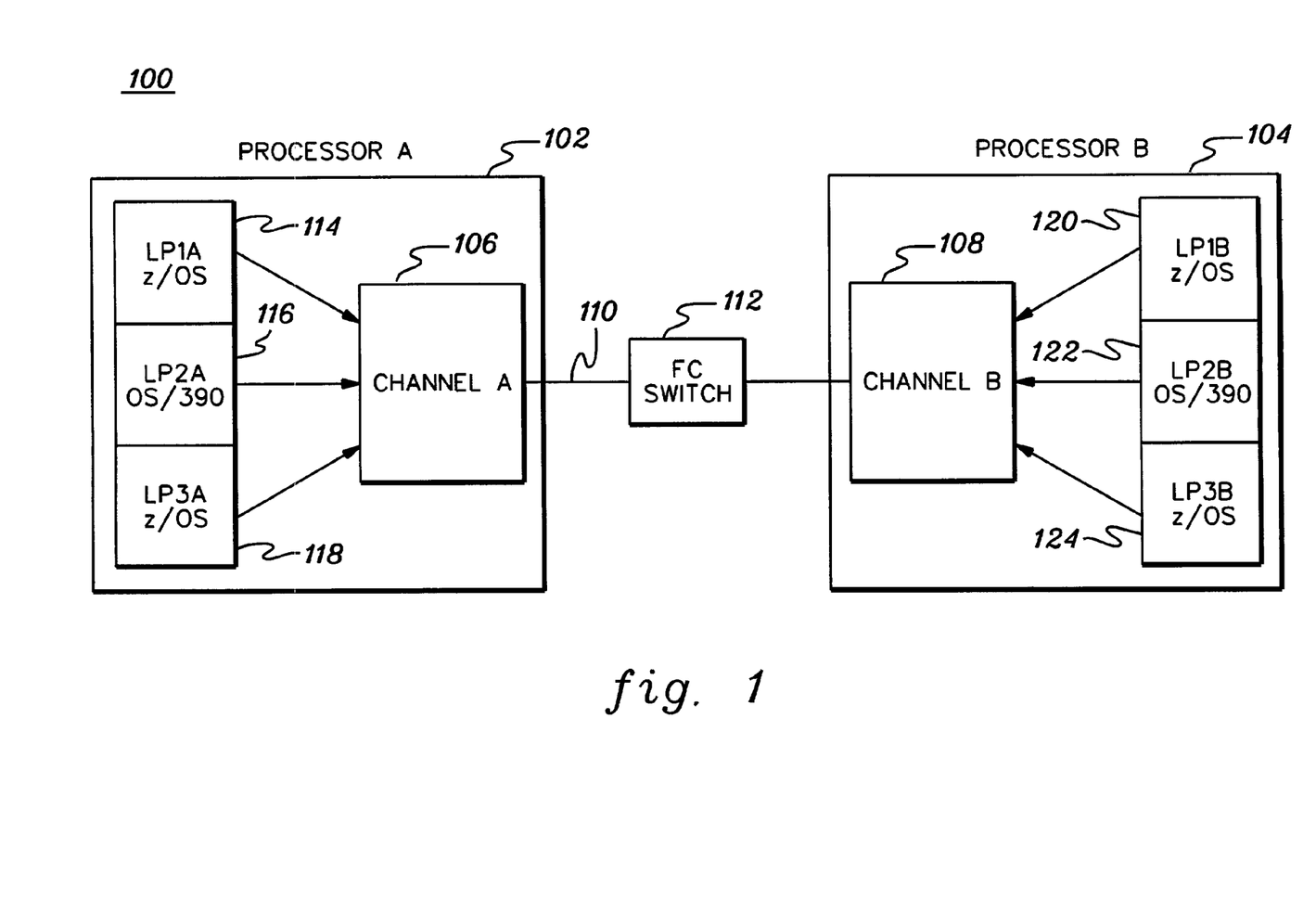
FIG. 1 is a block diagram of one embodiment of a computing environment wherein two channels, each shared by multiple logical partitions, are linked by a CTC connection via a fibre channel switch, and can employ a CTC connection validation technique, in accordance with an aspect of the present invention.

By way of example, FIG. 1 depicts one embodiment of a computing environment 100 having a processor A 102 and a processor B 104, which include a channel A 106 and a channel B 108, respectively. A logical path is established over physical link 110 (hereinafter, simply logical path 110) that links channel A 106 and channel B 108 via fibre channel (FC) switch 112. One example of an FC switch 112 is FICON Director offered by McData Corporation of Broomfield, Colo. and Inrange Technologies Corporation of Lumbertown, N.J. Via communication links, channel A is shared by logical partitions LP1A 114, LP2A 116 and LP3A 118. Similarly, logical partitions LP1B 120, LP2B 122, LP3B 124 share channel B. Alternatively, channel A and/or channel B could be unshared, in which case only one logical partition would have a link to the channel.

Figure 2A:
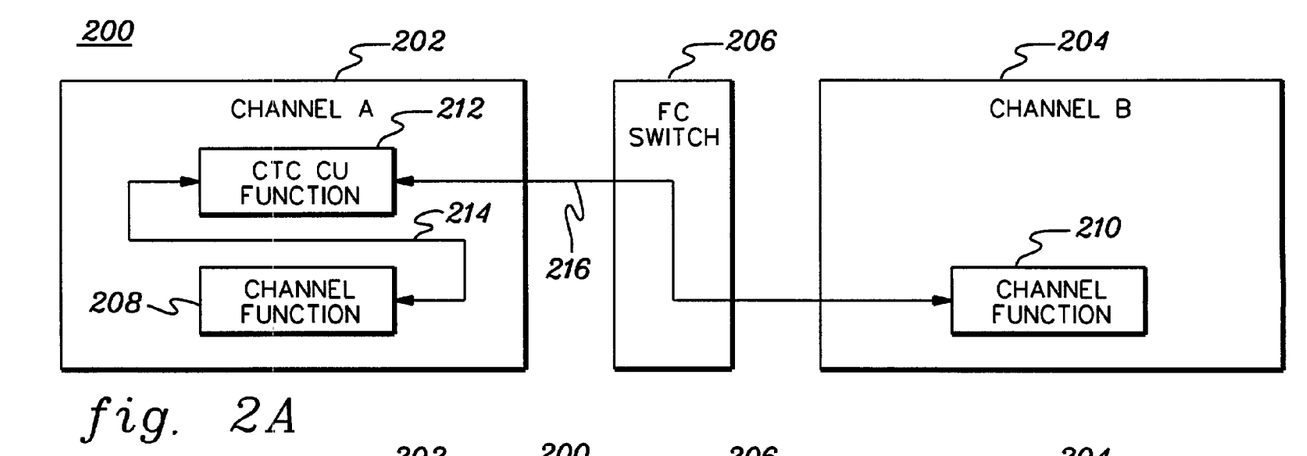
FIGS. 2A and 2B are block diagrams depicting one embodiment of a computing environment wherein a CTC control unit (CU) function moves from the channel on one end of the CTC connection to the channel on the other end, with the CTC connection to be validated, in accordance with an aspect of the present invention notwithstanding migration of the CU function.

A more detailed embodiment of the channels within a computing environment, generally denoted 200, is depicted in FIG. 2A, wherein a first computing system has a first channel 202 and a second computing system has a second channel 204 which are linked via a FC switch 206. Each channel includes a channel function 208, 210 and channel 202 includes an integrated CTC CU function 212. CTC CU function 212 comprises a control unit which coordinates communication between the channel functions within the different channels. The CTC CU function is described in the IBM publication entitled "ESCON and FICON Channel-to-Channel Reference," IBM Publication No. SB10-7034-01, Second Edition, October 2001.

In FICON architecture, device level communication between a channel and a control unit requires that a logical path be established between them. In the case of CTC communication, two channels each talk to a two-sided CTC control unit, therefore two logical paths are required for a complete CTC connection. A local logical path is established across an internal link between the channel function and the CTC function on the same channel. This path 214 is shown internal to channel A in FIG. 2A. The remote logical path is established across the Fibre Channel link. This path 216 is shown connecting the two channels through FC switch 206 in FIG. 2A.

Figure 2B:
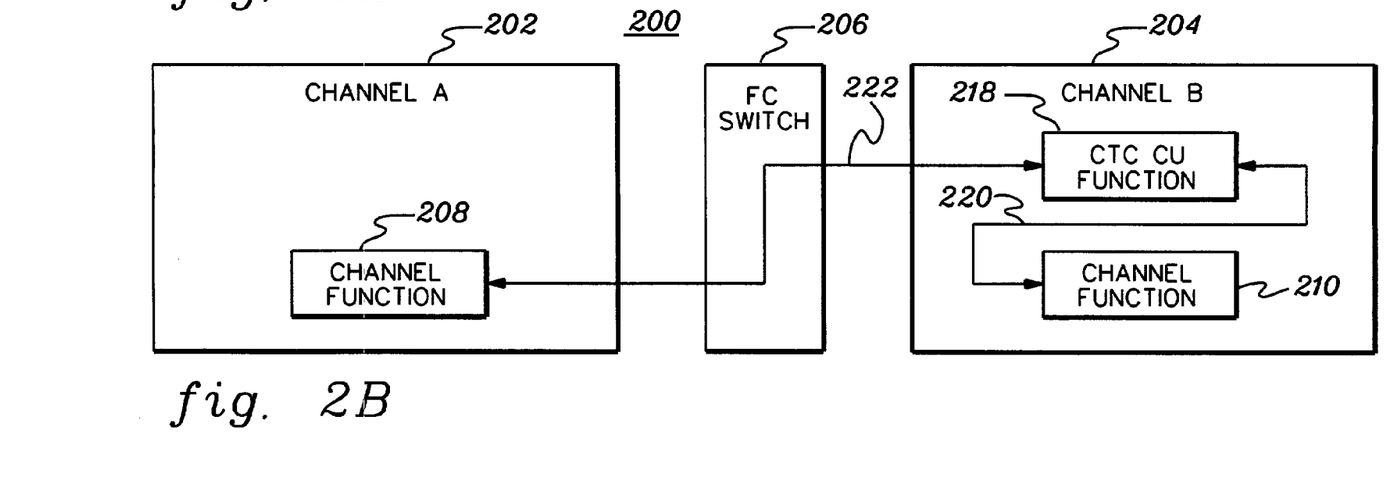

Both channels 202, 204 have the capability to include an integrated CTC CU function and can be, for instance, FICON channels offered by International Business Machines Corporation. In environments such as the FICON computing environment shown in FIG. 2A, the CTC CU function can switch from one channel to the other. This novel switching capability is described in U.S. patent application Ser. No. 09/569,755 entitled "Automatic Configuration of a Channel-to-Channel Connection Employing Channel-to-Channel Functioning Integrated Within One or More Channels of a Computing Environment," filed May 12, 2000. FIG. 2B depicts a new location of the CTC CU function 218 after such a switch. CTC CU function 218 has an internal path 220 to channel function 210 and an external path 222 to channel function 208 via FC switch 206. This switching of the CTC CU function can occur after various events, including a re-initialization of the CTC connection. When the CTC connection is initialized or re-initialized, a load balancing algorithm determines which end of the connection will provide the CTC CU function. The load balancing algorithm is described in U.S. patent application Ser. No. 09/569,755 entitled "Automatic Configuration of a Channel-to-Channel Connection Employing Channel-to-Channel Functioning Integrated Within One or More Channels of a Computing Environment," filed May 12, 2000.

Figure 3:
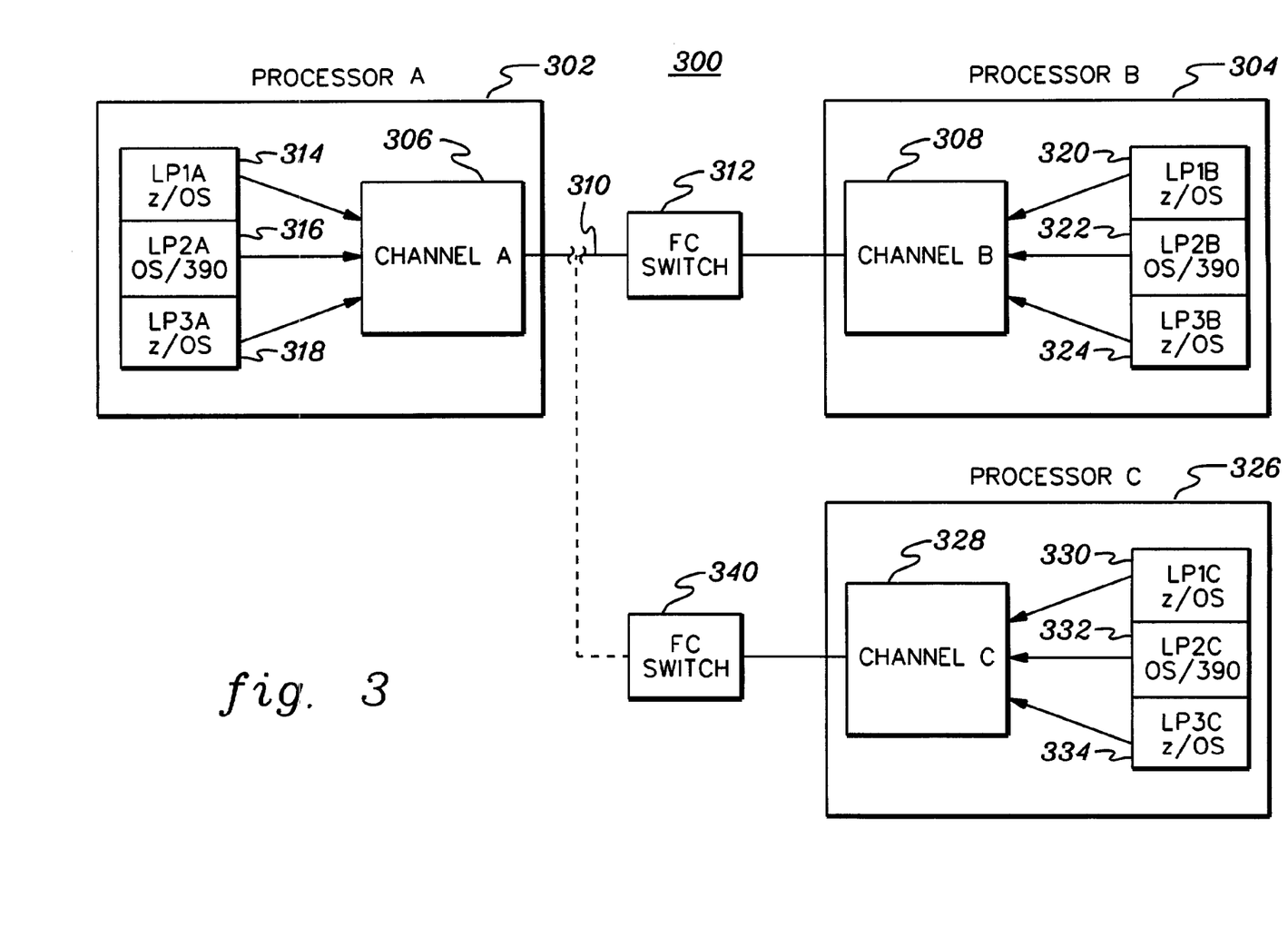
FIG. 3 depicts a computing environment having two alternative CTC connections following a re-initialization of the CTC connection, which is to undergo validation in accordance with an aspect of the present invention.

FIG. 3 depicts one embodiment of possible alternative CTC connections following re-initialization of a CTC connection. Similar to the environment depicted in FIG. 1, the CTC connection is first initialized in computing environment 300, where processor 302 and processor 304 include channels 306 and 308, respectively. A logical path established over physical link 310 (hereinafter, simply logical path 310) connects the channels via a FC switch 312. Channel 306 is shared by logical partitions 314, 316, 318, while channel 308 is shared by logical partitions 320, 322, 324. Assuming that the CTC CU function (not shown) resides in channel 308 following initialization of the connection, one possible result of a re-initialization (e.g., following an event such as a cabling error causing logical path 310 to be removed) is a new logical path from (shown in phantom) channel 306 via FC switch 340 to processor C 326. Processor 326 includes channel C 328, which is shared by logical partitions 330, 332, 334. In this configuration, the conventional validation method correctly invalidates the CTC connection following re-initialization because the new endpoint, channel C, is in a channel subsystem that is different from the one that contained the old endpoint, channel B.

Another possible result of re-initialization is logical path 310 remaining the same, but the CTC CU function (not shown) switching from channel 308 to channel 306. Under these circumstances, the endpoints of the CTC connection remain the same, thus posing no hindrance to accepting I/O requests that were queued before re-initialization. However, the conventional connection validation technique identifies the device associated with the CTC CU function as being in a different system and thus incorrectly invalidates the CTC connection. By comparison, the validation technique of the present invention described herein correctly validates this connection, as is evident from the logic depicted in FIGS. 4, 5A, 5B, 6A and 6B and described herein below.

Figure 4:
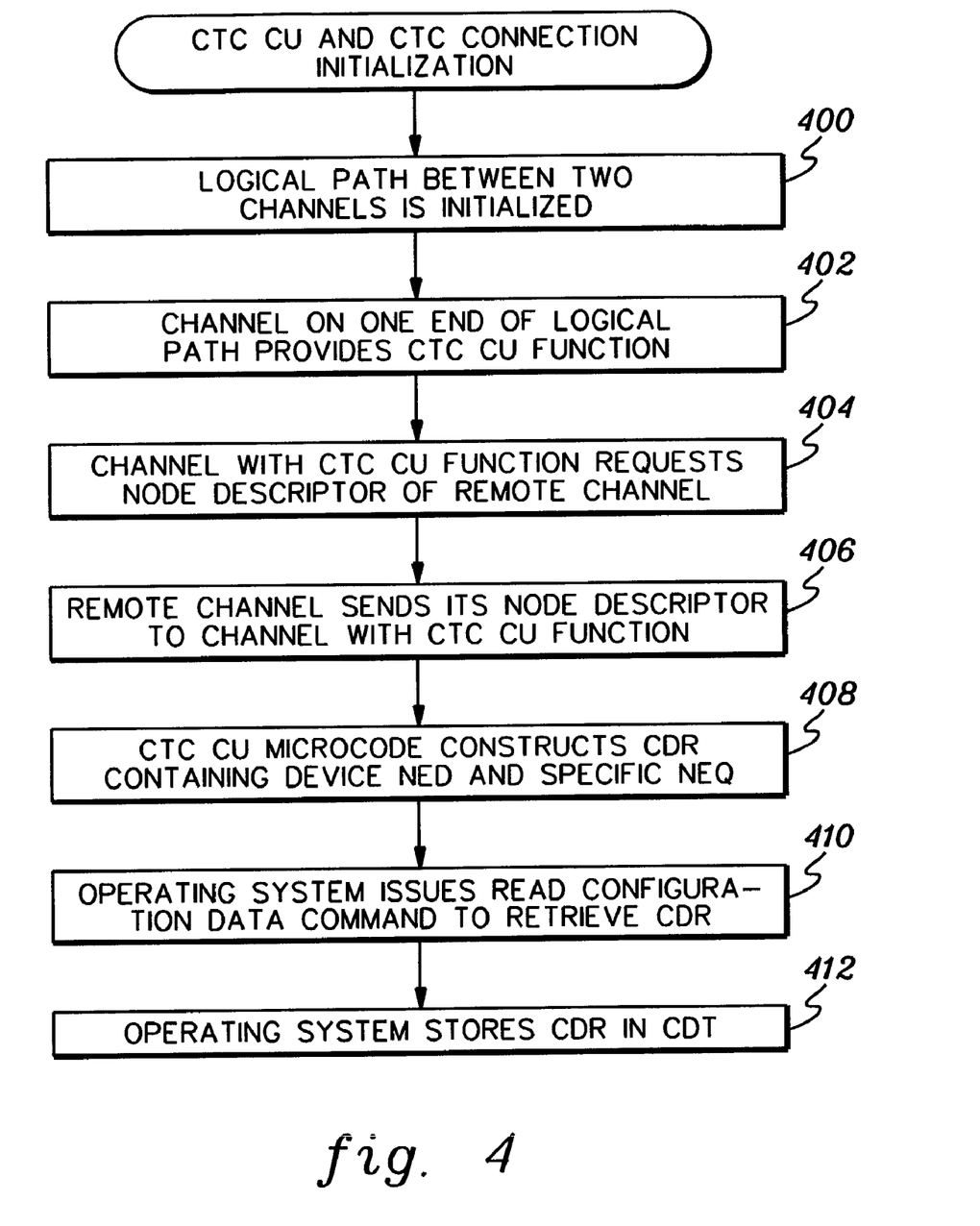
FIG. 4 is a flowchart of one embodiment of initializing a CTC connection, in accordance with an aspect of the present invention.

One embodiment of logic associated with initialization of a CTC CU function and a CTC connection between two channels is depicted in FIG. 4. This initialization process may occur, for instance, when computing systems that include the channels are brought online. The initialization of a logical path between two channels 400 comprises, e.g., establishing connections between FC switch 112 and channels 106, 108 respectively (FIG. 1). This logical path initialization process is described in detail in U.S. Pat. No. 6,338,083, which is hereby incorporated herein by reference in its entirety.

Initialization of the CTC CU function begins with an ELP (Establish Logical Path) request sent, for example, from channel A 106 to channel B 108 (FIG. 1). Channel B 108 responds with an LPE (Logical Path Established) command if it will provide the CTC CU function. If channel B will not provide the CTC CU function, it responds with a LRJ (Link Reject), with a 'protocol error' indicated for the reject reason. In the case of LRJ, channel B sends its own ELP to channel A. Through a procedure that balances the load of CTC CU functions currently supported by the ELP sender and the ELP receiver, either channel A or channel B will provide the CTC CU function 402. The ELP, LPE and LRJ commands are described in Fibre Channel Single-Byte Command Code Sets-2 Mapping Protocol (FC-SB-2) Rev. 2.1, Dec. 6, 2000, American National Standards Institute, which is hereby incorporated herein by reference in its entirety. Again, details of the load balancing algorithm summarized herein can be found in U.S. patent application Ser. No. 09/569,755 entitled "Automatic Configuration of a Channel-to-Channel Connection Employing Channel-to-Channel Functioning Integrated Within One or More Channels of a Computing Environment," filed May 12, 2000.

Once the CTC CU function is provided 402 and a device associated with a channel subsystem in one processor 104 (FIG. 1) can communicate with a program in, for instance, an operating system 114 in another processor 102, a CTC connection is initialized.

When a device is initialized for use, the state of the current configuration is recorded using data derived from, for example, the self description capabilities of the components (e.g., devices and channels) of a CTC connection. Self description is the ability of components of a system to provide unique identification information about themselves dynamically on request.

Collection of self description data begins when the channel providing the CTC CU function sends an RNID (Request Node Identification Data) command to the remote channel 404. The remote channel returns a Node Descriptor (ND) to the channel providing the CTC CU function 406. An ND is a 32 byte field containing data describing a node (e.g., channel). A node comprises identifiable components called node elements. A node element may be an I/O device or a control unit. The microcode comprising the CTC CU function uses the ND to construct a configuration data record (CDR) 408, which can be used to describe the device controlled by the CTC CU function.

Figure 7A:
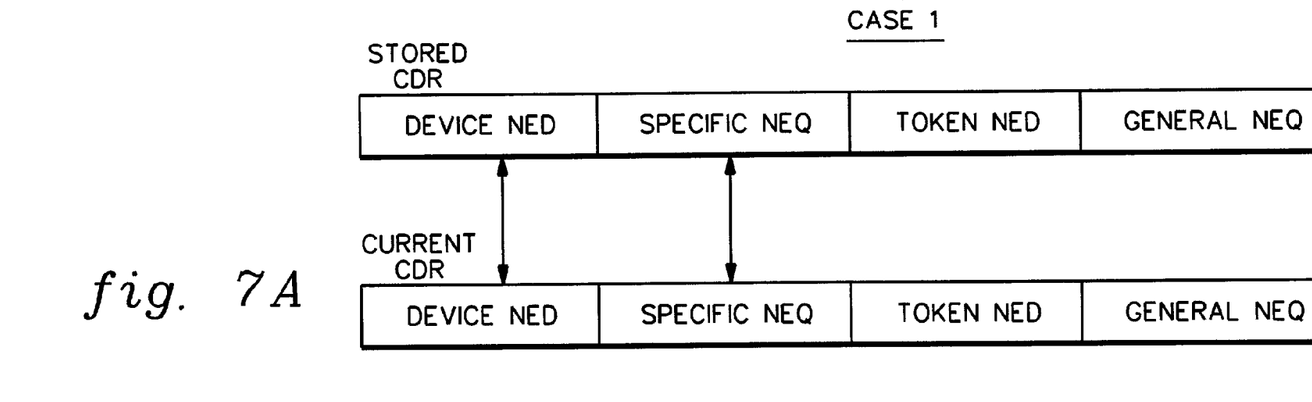
FIGS. 7A and 7B depict one embodiment of the contents of a CDR an summarize the comparison process of FIGS. 6A and 6B, in accordance with an aspect of the present invention.

The CDR described herein and depicted in FIG. 7A is in a new format that includes the following fields: Device NED, Specific NEQ, Token NED and General NEQ. As one example, the Device NED (hereinafter, simply NED) describes a device using the ND data of the channel that provides the CTC CU function. The Specific NEQ (hereinafter NEQ or SNEQ) includes, for instance, identification information from the remote channel. An NEQ immediately follows the NED that describes the node element to which the NEQ information applies, and is thus "specific" to that NED. The Token NED (TNED) is used to establish and identify a relationship between two or more configuration records. If an NED appears in more than one CDR, all those CDRs have the same TNED. The General NEQ (GNEQ) contains device-dependent information that is not related to a particular node element.

Operating systems at each end of the CTC connection (e.g., LP1A 114 and LP1B 120 of FIG. 1) retrieve the CDR by, for example, issuing an RCD (Read Configuration Data) command to the CTC control unit 410. The RCD command is described in Enterprise Systems Architecture/390 Common I/O-Device Commands, SA22-7204-01, 1992, International Business Machines Corporation, which is hereby incorporated herein by reference in its entirety. After retrieving the CDR, each operating system stores the CDR in a Configuration Data Table (CDT) residing therein 412.

Figure 5A:
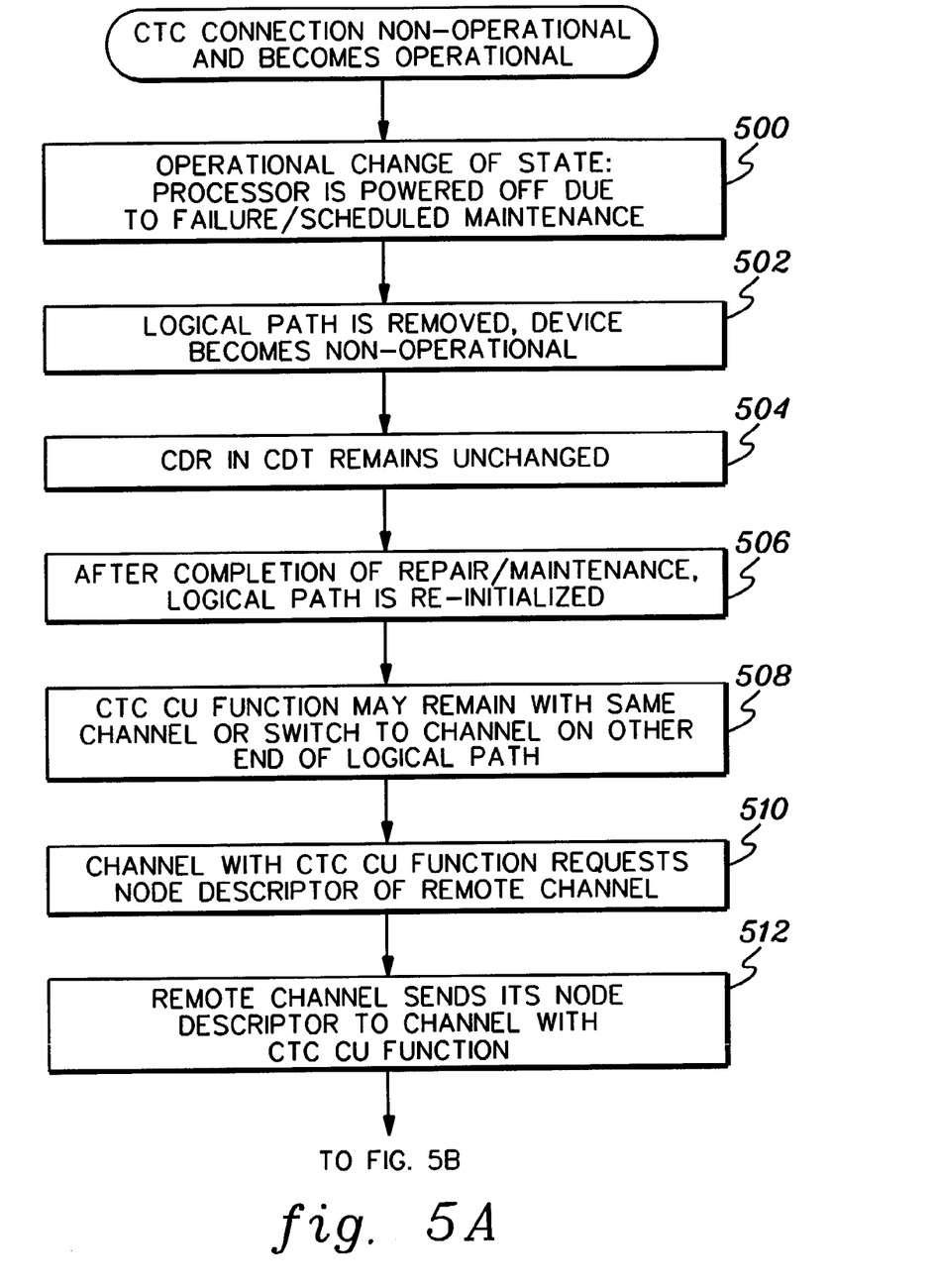
FIGS. 5A and 5B are a flowchart of one embodiment of a validation process wherein a CTC connection becomes non-operational and thereafter operational, in accordance with an aspect of the present invention.
Figure 5B:
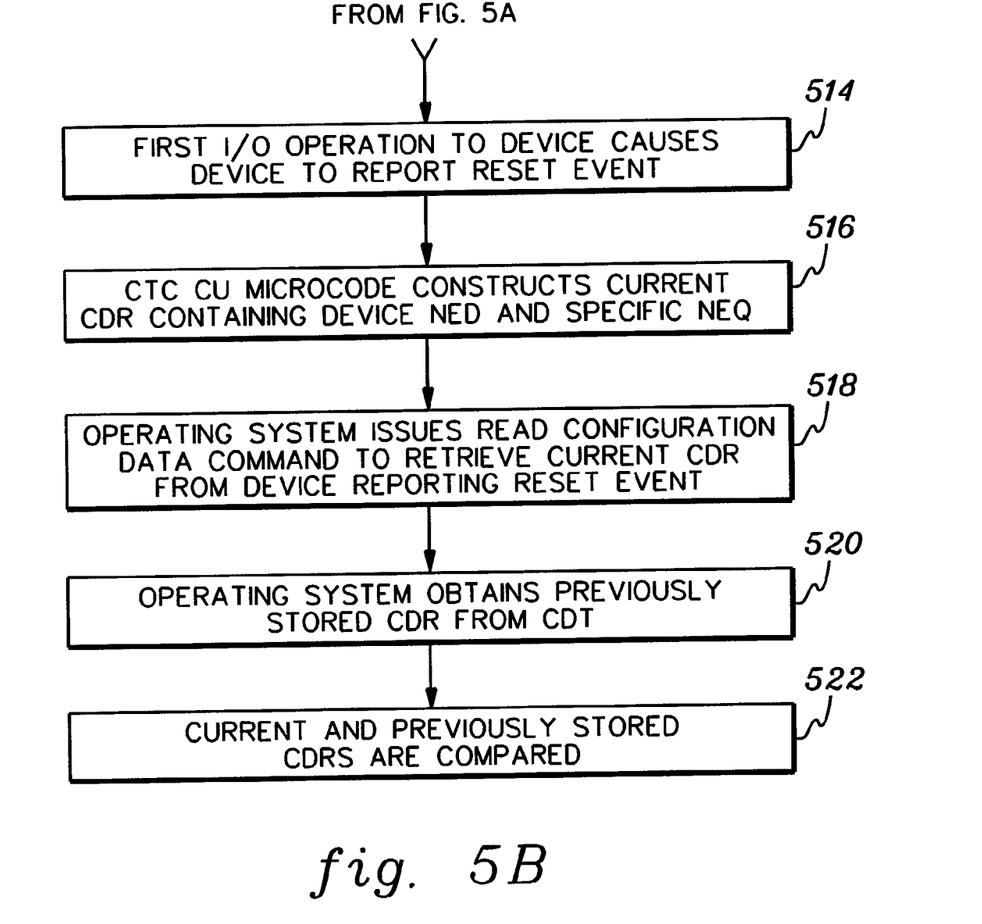

One embodiment of a validation process, in accordance with an aspect of the present invention, for use with a CTC connection becoming non-operational and operational again is depicted in FIGS. 5A and 5B. After a period during which the CTC connection operates normally, an operational change of state may occur at one end of the CTC connection due to an event, such as a failure, initial program load (IPL), power down, power on reset (POR), cabling error, configuring a channel path offline and back online, or planned maintenance 500. As an example, a channel power down condition causes logical path 110 to be removed and thus any attempted I/O to the devices will appear non-operational 502. FC switch 112 then detects a link change. The link change is confirmed and the state of logical path 110 is changed to "not established" on the non-powered down channel.

Any I/O operations issued by operating system software while the failure state persists and no logical path exists result in a non-operational condition being presented to the software. Devices that are found to be non-operational remain online and available to applications; however, I/O requests to the device are kept queued by the operating system until the non-operational condition has been repaired. By remaining online but not operational, devices may become operational again without operator intervention. During this failure state the CDT is left initialized with the CDR that was constructed when the device was first put into use 504 (FIG. 5A).

After the link is repaired, the logical path is re-initialized 506. The CTC CU function may then switch from one end of the CTC connection to the other 508 in accordance with the load balancing procedure described above relative to FIG. 4. The channel with the CTC CU function requests an ND from the remote channel 510 and the remote channel returns its ND to the requesting channel 512. After being informed that an I/O Resource Accessible Event has occurred, the operating system redrives the I/O requests that had been queued for the device as a result of the logical path becoming non-operational 502.

As depicted in FIG. 5B, the first of the queued I/O requests sent to the device causes the device to report through re-initialization. The reset event prompts the operating system to perform a self description validation process to verify that the device now communicating via the CTC connection is the same as the one communicating before the link failure occurred. The CTC CU function microcode constructs a current CDR in the new format 516. Similar to the formation of the CDR discussed above in relation to FIG. 4, the NED in the current CDR is constructed from, for example, the ND data of the channel providing the CTC CU function. The NEQ in the current CDR is constructed from the ND of the remote channel.

Continuing with the validation procedure in FIG. 5B, the operating system issues an RCD command to obtain the current CDR from the device reporting the reset event 518. The operating system also obtains the previously stored CDR from its CDT 520. The contents of the current and previously stored are then compared 522. This comparison can be done by, for example, an Input/Output Supervisor. The Input/Output Supervisor (IOS) is a component of the operating system responsible for managing I/O resources, scheduling I/O requests and providing recovery methods when I/O resources fail or present certain errors, such as reset events. IOS resides in the operating system of each logical partition.

Figure 6A:
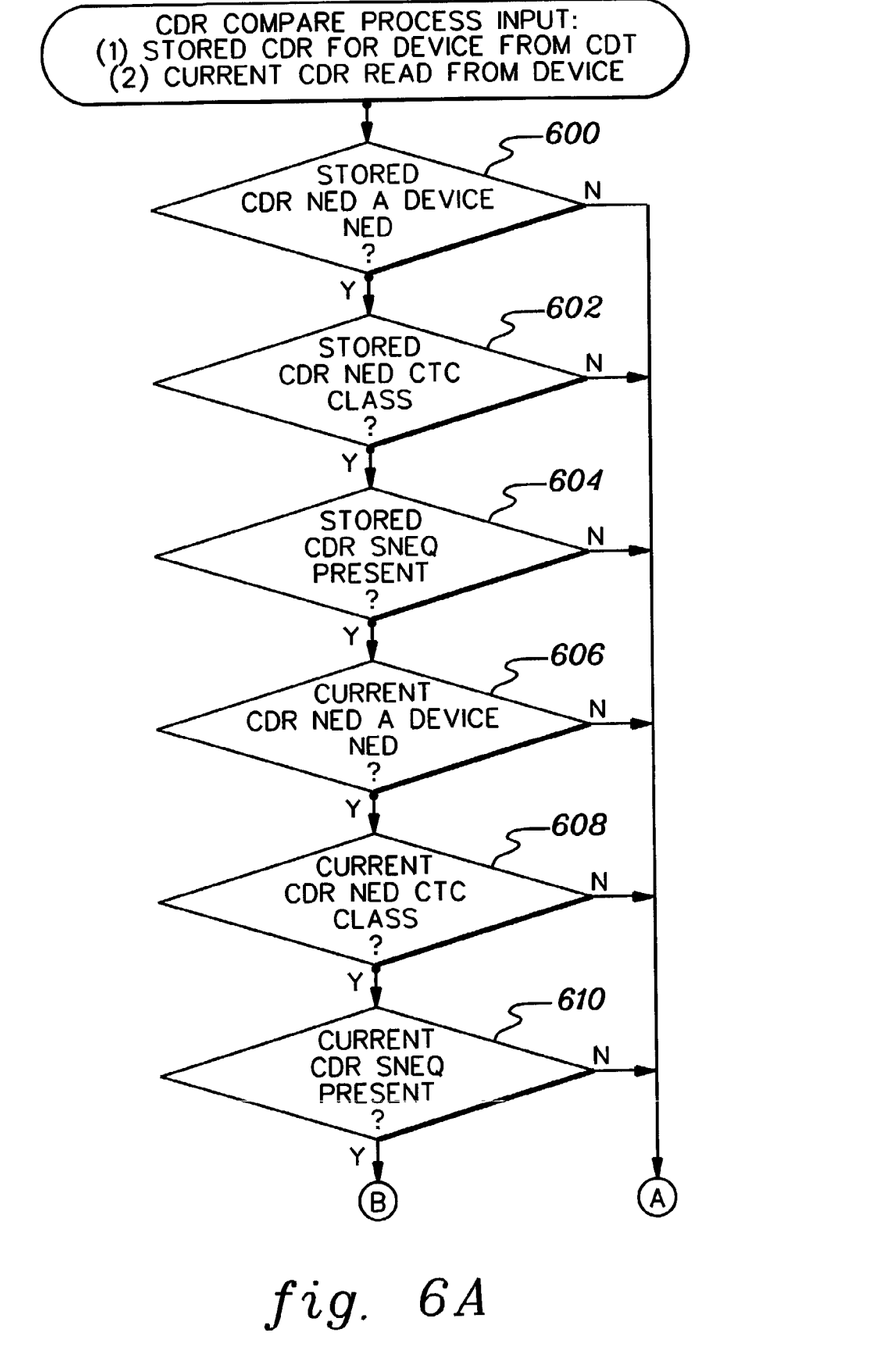
FIGS. 6A and 6B are a flowchart of one embodiment of a process for comparing a stored configuration data record (CDR) for a device with a current CDR read from a device for use with the validation process of FIGS. 5A and 5B, in accordance with an aspect of the present invention.
Figure 6B:
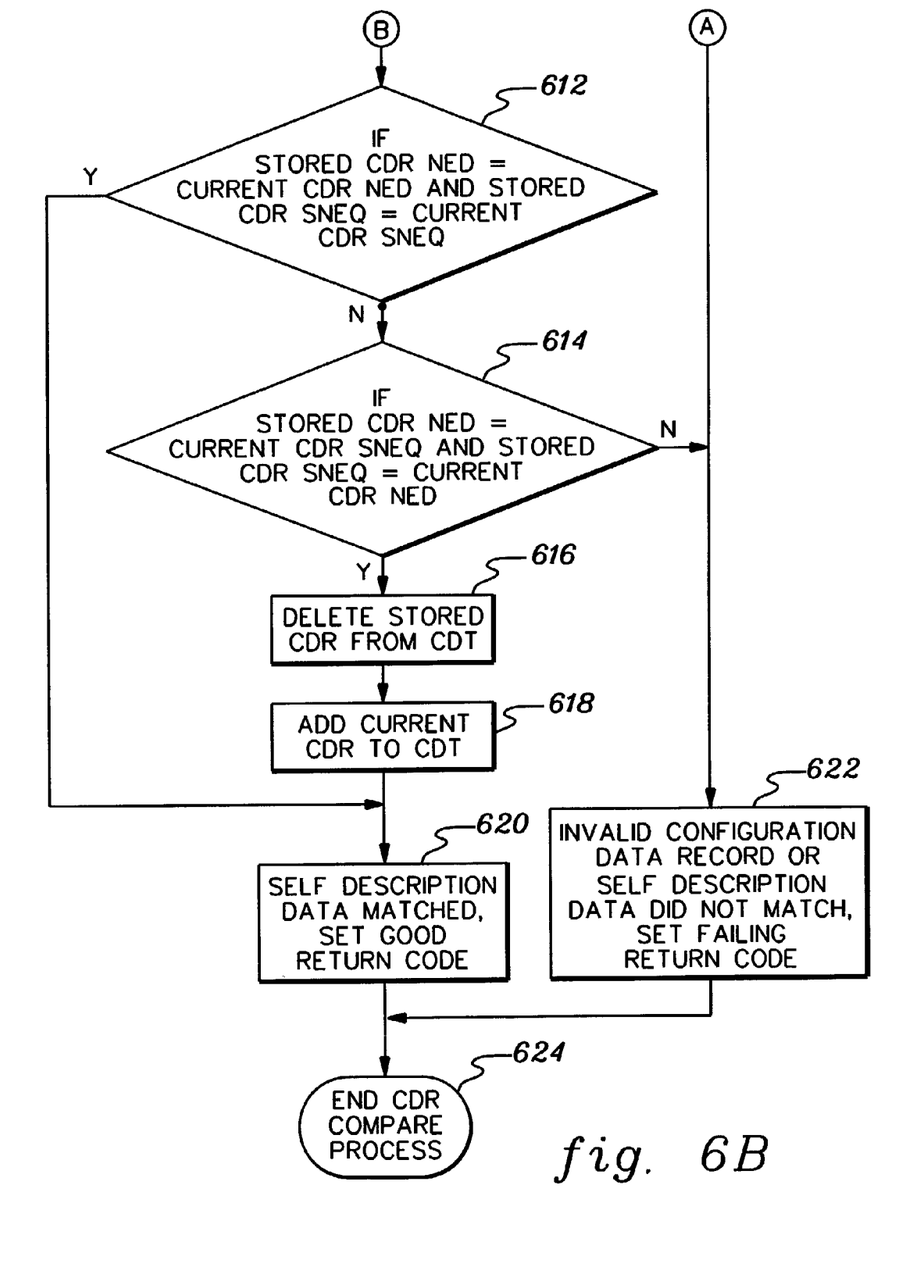

FIGS. 6A and 6B depict one embodiment of comparison logic in accordance with an aspect of the present invention. This logic compares the stored CDR and the current CDR 522 for purposes of validating a CTC connection Certain preliminary aspects of the stored CDR are checked first. If the self description data of the stored NED indicates that it is associated with a device 600, if the stored NED is classified as CTC 602, and if the stored SNEQ is present 604, then preliminary aspects of the current CDR are checked; otherwise, a failing return code is set to indicate that self description data in the stored CDR is not correct 622 and the compare process ends 624 (see FIG. 6B). If the stored CDR passes the preliminary checks, similar checks are performed on the current NED and current SNEQ 606, 608, 610. If the current CDR fails any of the preliminary checks, a failing return code is set 622 and the compare process ends 624 (see FIG. 6B).

If the current CDR passes all of the preliminary checks, the various combinations of NED and NEQ pairs are checked for matches in the flowchart shown in FIG. 6B. The first check of the pairs is a straight check of the NED and NEQ fields, and is depicted in FIG. 7A. If the stored NED matches the current NED and the stored NEQ matches the current NEQ 612, it is an indication that the CTC CU function remained in the same channel after the CTC connection was re-initialized. In this case, the self description data is a match and the CTC connection is validated with a "good" return code 620. The CDT entry need not be updated because the current NED and current NEQ are the same as their respective stored values.

Figure 7B:
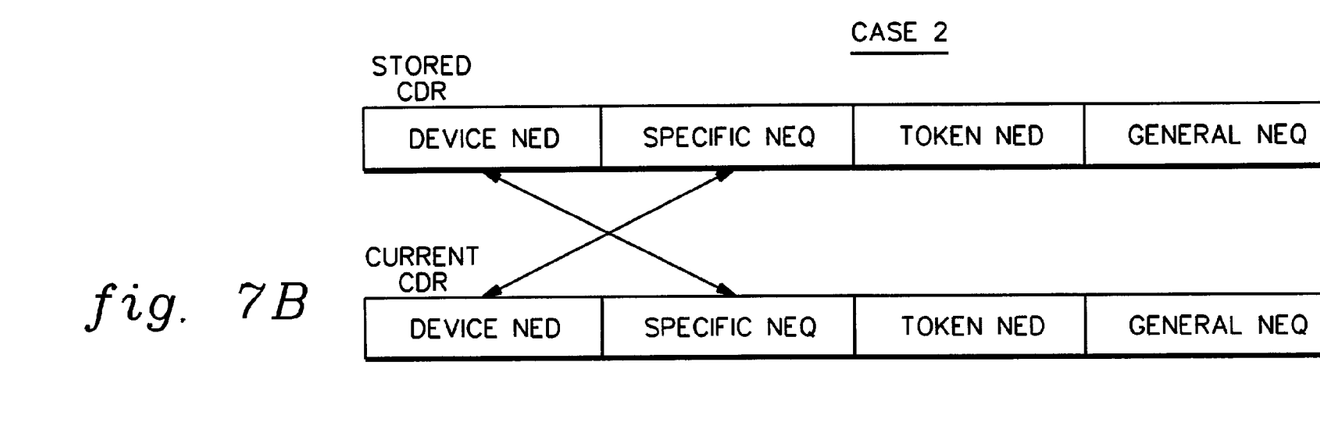

If the comparison 612 fails, a cross-comparison of the NED and NEQ fields is performed next as depicted in FIG. 7B. If the stored NED matches the current NEQ and the stored NEQ matches the current NED 614, then the CTC CU function migrated from one channel to the other, but the endpoints of the CTC connection remained the same after re-initialization of the connection. Under these circumstances, the stored CDR entry is updated with the current CDR 616, 618, the CTC connection is validated 620, and the compare process ends 624. If the cross-comparison 614 fails, then the self-description data in the stored and current CRDs does not match 622 and the comparison process ends 624.

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of validating a channel-to-channel (CTC) connection between a first channel and a second channel in a computing environment, wherein a CTC control unit (CU) function is provided within either channel upon initialization of the CTC connection and can switch channels with re-initialization of the CTC connection, said method comprising:
   obtaining a first node element descriptor (NED) of one channel of a first channel and a second channel and a first node element qualifier (NEQ) of the other channel of the first channel and the second channel with initialization of a CTC connection therebetween;
   upon re-initialization of the CTC connection, obtaining a second NED of one channel of the first channel and the second channel and a second NEQ of the other channel of the first channel and the second channel; and
   validating the re-initialized CTC connection if the first NED matches the second NED and the first NEQ matches the second NEQ, or if the first NED matches the second NEO and the first NEO matches the second NED.

2. The method of claim 1, wherein said obtaining the first NED comprises obtaining identification data from the one channel of the first channel and the second channel, and said obtaining the first NEQ comprises obtaining identification data from the other channel, and wherein the CTC CU function of the CTC connection is provided within said one channel.

3. The method of claim 2, wherein said obtaining the first NED and the first NEQ further comprises storing the first NED and the first NEQ.

4. The method of claim 3, wherein said validating further comprises retrieving the stored first NED and the stored first NEQ for comparison with the second NED and the second NEQ.

5. The method of claim 1, wherein said obtaining the second NED comprises obtaining identification data from the one channel of the first channel and the second channel, and said obtaining the second NEQ comprises obtaining identification data from the other channel, and wherein the CTC CU function upon re-initialization of the CTC connection is provided within said one channel.

6. The method of claim 1, wherein said validating the re-initialized CTC connection comprises automatically validating the re-initialized CTC connection if the first NED matches the second NED and the first NEQ matches the second NEQ, or if the first NED matches the second NEQ and the first NEQ matches the second NED.

7. The method of claim 1, wherein said validating the re-initialized CTC connection comprises updating the first NED and the first NEQ if the first NED matches the second NEQ and the first NEQ matches the second NED, wherein said updating comprises updating the value of the first NED with the value of the second NED and updating the value of the first NEQ with the value of the second NEQ.

8. The method of claim 1, wherein said obtaining the first NED and the first NEQ comprises retrieving the first NED and first NEQ from a stored configuration data record (CDR) associated with the initialized CTC connection.

9. The method of claim 8, wherein said obtaining the second NED and the second NEQ comprises accessing a current NED and a current NEQ associated with the re-initialized CTC connection.

10. The method of claim 1, wherein said validating the CTC connection further comprises verifying that the first NED and the second NED describe I/O device node elements within a CTC adapter class.

11. A system for validating a channel-to-channel (CTC) connection between a first channel and a second channel in a computing environment, wherein a CTC control unit (CU) function is provided within either channel upon initialization of the CTC connection and can switch channels with re-initialization of the CTC connection, said system comprising:
   means for obtaining a first node element descriptor (NED) of one channel of a first channel and a second channel and a first node element qualifier (NEQ) of the other channel of the first channel and the second channel with initialization of a CTC connection therebetween;
   means for obtaining, upon re-initialization of the CTC connection, a second NED of one channel of the first channel and the second channel and a second NEQ of the other channel of the first channel and the second channel; and
   means for validating the re-initialized CTC connection if the first NED matches the second NED and the first NEQ matches the second NEQ, or if the first NED matches the second NEQ and the first NEQ matches the second NED.

12. The system of claim 11, wherein said means for obtaining the first NED comprises means for obtaining identification data from the one channel of the first channel and the second channel, and said means for obtaining the first NEQ comprises means for obtaining identification data from the other channel, and wherein the CTC CU function of the CTC connection is provided within said one channel.

13. The system of claim 12, wherein said means for obtaining the first NED and the first NEQ further comprises means for storing the first NED and the first NEQ.

14. The system of claim 13, wherein said means for validating further comprises means for retrieving the stored first NED and the stored first NEQ for comparison with the second NED and the second NEQ.

15. The system of claim 11, wherein said means for obtaining the second NED comprises means for obtaining identification data from the one channel of the first channel and the second channel, and said means for obtaining the second NEQ comprises means for obtaining identification data from the other channel, and wherein the CTC CU function upon re-initialization of the CTC connection is provided within said one channel.

16. The system of claim 11, wherein said means for validating the re-initialized CTC connection comprises means for automatically validating the re-initialized CTC connection if the first NED matches the second NED and the first NEQ matches the second NEQ, or if the first NED matches the second NEQ and the first NEQ matches the second NED.

17. The system of claim 11, wherein said means for validating the re-initialized CTC connection comprises means for updating the first NED and the first NEQ if the first NED matches the second NEQ and the first NEQ matches the second NED, wherein said means for updating comprises means for updating the value of the first NED with the value of the second NED and means for updating the value of the first NEQ with the value of the second NEQ.

18. The system of claim 11, wherein said means for obtaining the first NED and the first NEQ comprises means for retrieving the first NED and first NEQ from a stored configuration data record (CDR) associated with the initialized CTC connection.

19. The system of claim 18, wherein said means for obtaining the second NED and the second NEQ comprises means for accessing a current NED and a current NEQ associated with the re-initialized CTC connection.

20. The system of claim 11, wherein said means for validating the CTC connection further comprises means for verifying that the first NED and the second NED describe I/O device node elements within a CTC adapter class.

21. A system for validating a channel-to-channel (CTC) connection between a first channel and a second channel in a computing environment, wherein a CTC control unit (CU) function is provided within either channel upon initialization of the CTC connection and can switch channels with re-initialization of the CTC connection, said system comprising:
- a first computing unit adapted to obtain a first node element descriptor (NED) of one channel of a first channel and a second channel and a first node element qualifier (NEQ) of the other channel of the first channel and the second channel with initialization of a CTC connection therebetween;
- a second computing unit adapted to obtain, upon re-initialization of the CTC connection, a second NED of one channel of the first channel and the second channel and a second NEQ of the other channel of the first channel and the second channel; and
- a third computing unit adapted to validate the re-initialized CTC connection if the first NED matches the second NED and the first NEQ matches the second NEQ, or if the first NED matches the second NEQ and the first NEQ matches the second NED.

22. The system of claim 21, wherein the first computing unit and the second computing unit are the same operating system unit.

23. At least one program storage device readable by a machine tangibly embodying at least one program of instructions executable by the machine to perform a method of validating a channel-to-channel (CTC) connection between a first channel and a second channel in a computing environment, wherein a CTC control unit (CU) function is provided within either channel upon initialization of the CTC connection and can switch channels with re-initialization of the CTC connection, comprising:
- obtaining a first node element descriptor (NED) of one channel of a first channel and a second channel and a first node element qualifier (NEQ) of the other channel of the first channel and the second channel with initialization of a CTC connection therebetween;
- upon re-initialization of the CTC connection, obtaining a second NED of one channel of the first channel and the second channel and a second NEQ of the other channel of the first channel and the second channel; and
- validating the re-initialized CTC connection if the first NED matches the second NED and the first NEQ matches the second NEQ, or if the first NED matches the second NEQ and the first NEQ matches the second NED.

24. The at least one program storage device of claim 23, wherein said obtaining the first NED comprises obtaining identification data from the one channel of the first channel and the second channel, and said obtaining the first NEQ comprises obtaining identification data from the other channel, and wherein the CTC CU function of the CTC connection is provided within said one channel.

25. The at least one program storage device of claim 24, wherein said obtaining the first NED and the first NEQ further comprises storing the first NED and the first NEQ.

26. The at least one program storage device of claim 25, wherein said validating further comprises retrieving the stored first NED and the stored first NEQ for comparison with the second NED and the second NEQ.

27. The at least one program storage device of claim 23, wherein said obtaining the second NED comprises obtaining identification data from the one channel of the first channel and the second channel, and said obtaining the second NEQ comprises obtaining identification data from the other channel, and wherein the CTC CU function upon re-initialization of the CTC connection is provided within said one channel.

28. The at least one program storage device of claim 23, wherein said validating the re-initialized CTC connection comprises automatically validating the re-initialized CTC connection if the first NED matches the second NED and the first NEQ matches the second NEQ, or if the first NED matches the second NEQ and the first NEQ matches the second NED.

29. The at least one program storage device of claim 23, wherein said validating the re-initialized CTC connection comprises updating the first NED and the first NEQ if the first NED matches the second NEQ and the first NEQ matches the second NED, wherein said updating comprises updating the value of the first NED with the value of the second NED and updating the value of the first NEQ with the value of the second NEQ.

30. The at least one program storage device of claim 23, wherein said obtaining the first NED and the first NEQ comprises retrieving the first NED and first NEQ from a configuration data record (CDR) associated with the initialized CTC connection.

31. The at least one program storage device of claim 30, wherein said obtaining the second NED and the second NEQ comprises accessing a current NED and a current NEQ associated with the re-initialized CTC connection.

32. The at least one program storage device of claim 22, wherein said validating the CTC connection further comprises verifying that the first NED and the second NED describe I/O device node elements within a CTC adapter class.

33. A storage medium having a data structure stored thereon, the data structure comprising a configuration record (CDR) validating a channel-to-channel (CTC) connection between a first channel and a second channel in computing environment, wherein a CTC control unit function is provided within either channel upon initialization of the CTC connection and can switch channels with re-initialization of the CTC connection, said CDR comprising:
- a first field including a node element descriptor (NED) that includes unique device identification data from one channel of a first channel and second channel; and
- a second field including a specific node element qualifier (NEQ) includes identification data of the other channel of the first channel and the second channel.

* * * * *

UNITED STATES PATENT AND TRADEMARK OFFICE
CERTIFICATE OF CORRECTION

| | | |
|---|---|---|
| PATENT NO. | : 7,039,693 B2 | Page 1 of 1 |
| APPLICATION NO. | : 10/244285 | |
| DATED | : May 2, 2006 | |
| INVENTOR(S) | : Driever et al. | |

It is certified that error appears in the above-identified patent and that said Letters Patent is hereby corrected as shown below:

Col. 7, line 56 insert --a reset event 514, indicating that the device has been reset-- after the word "report"

Claims:

Claim 1

Col. 9, line 34, delete the words "NEO" in the first and second instance and insert --NEQ-- in both instances Signed and Sealed this First Day of August, 2006

JON W. DUDAS
*Director of the United States Patent and Trademark Office*